United States Patent [19]
Quat et al.

[11] Patent Number: 5,863,218
[45] Date of Patent: Jan. 26, 1999

[54] BATTERY TERMINAL COUPLING ASSEMBLY

[75] Inventors: Ou Jeng Quat, Klang; Tee Hoh Quah, Penang, both of Malaysia

[73] Assignee: Motorola, Inc., Schaumburg, Ill.

[21] Appl. No.: 784,679

[22] Filed: Jan. 22, 1997

[30] Foreign Application Priority Data

Jan. 24, 1996 [MY] Malaysia .......................... PI 960 0259

[51] Int. Cl.⁶ .................................................... H01R 3/00
[52] U.S. Cl. .............................................. 439/500; 429/96
[58] Field of Search .................................. 439/500, 627; 429/96–100, 123

[56] References Cited

U.S. PATENT DOCUMENTS 4,731,306  3/1988  Dumbser ..................................... 429/96
5,369,802  11/1994  Murray ....................................... 429/96

*Primary Examiner*—Khiem Nguyen
*Assistant Examiner*—Eugene G. Byrd
*Attorney, Agent, or Firm*—Frank M. Scutch, III

[57] ABSTRACT

A battery coupling assembly (1) for a portable device comprising a housing (2) with associated battery terminal engagement connectors (3, 4) for electrically engaging terminals of a supplying battery. The connectors allow electrical power to be supplied to the device and continuously electrically engage terminals of a replacement battery during removal and replacement of the supplying battery.

10 Claims, 1 Drawing Sheet

BATTERY TERMINAL COUPLING ASSEMBLY

TECHNICAL FIELD

This invention relates to a battery terminal coupling assembly for providing an electrical contact with terminals of both a power supplying battery and a replacement battery.

BACKGROUND OF THE INVENTION

Battery powered electrical and electronic devices have the advantage of portability. However, when the battery supplying electrical power requires replacing the device usually becomes inoperable during removal of the battery and insertion of a replacement battery. This can be inconvenient, for example, if the device is a mobile phone or pager as the replacement of a battery may result in a premature termination of an important business transaction or loss of a paged message.

To overcome the above problem, temporary storage elements such as switched capacitors have been inserted into the power backup circuitry of portable electronic devices. These capacitors have an associated switch which, upon the removal of the battery, will automatically connect the capacitor to the electronic circuitry of the device. The replacement battery can then be inserted without the device becoming inoperable by the temporary loss of power. However, the switched capacitors or other similar storage elements can increase the cost and size of the portable device which is undesirable especially for portable devices such as pagers and mobile phones.

BRIEF DESCRIPTION OF THE DRAWINGS

In order that the invention may be readily understood and put into practical affect, reference will now be made to preferred embodiments as illustrated with reference to the accompanying drawings in which.

DETAILED DESCRIPTION OF THE PREFERRED EMBODIMENTS OF THE INVENTION

Figure 1:
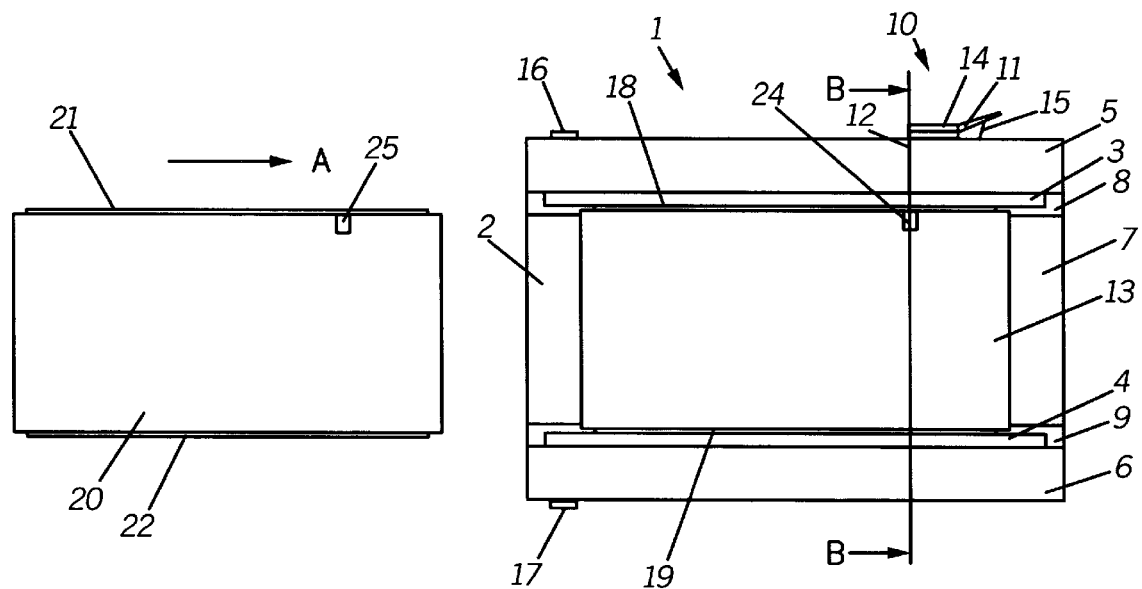
FIG. 1 is a front view illustrating a first embodiment of a battery terminal coupling assembly in accordance with the invention.
Figure 2:
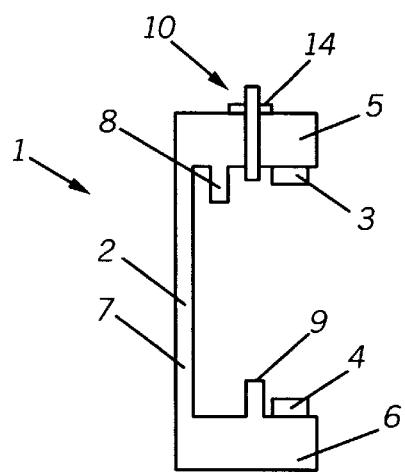
FIG. 2 is a cross-sectional view through B—B of the battery coupling assembly of FIG. 1.

Referring to FIGS. 1 and 2 there is illustrated a battery coupling assembly 1 comprising a housing 2 and battery terminal engagement means in the form of two spaced electrically conductive elongate members 3, 4. Housing 2 comprises two opposing members 5, 6 spaced between a web 7.

Extending from member 5 is a guide track 8 and a similar guide track 9 extends from member 6. A latch 10 pivotally mounted to member 5 comprises a handle 11 and an engaging pin 12 extending through member 5 for engagement with a recess 24 in a supplying battery 13.

Latch 10 is pivotally mounted to member 5 about a pivotal mount 14 and a leaf spring 15 provides biasing of latch 10. This therefore provides securement of battery 13 to housing 2 by the complementary engagement of pin 12 and recess 24.

Elongate members 3, 4 are made from a resilient electrically conductive material for providing good electrical contact with respective battery terminals 18, 19 of battery 13. Mounted in electrical contact with elongate member 3 is an electrically conductive pin 16 which extends through member 5 for providing electrical power to a portable device (not shown). Similarly, mounted in electrical contact with elongate member 4 is an electrically conductive pin 17 which extends through member 6 for providing electrical power to the portable device.

In use when battery 13 requires replacing due to a low charge or otherwise handle 11 of latch 10 is pushed towards member 5 therefore releasing engagement of pin 12 and recess 24. A replacement battery 20 with battery terminals 21,22 is then moved in a direction illustrated by arrow A so that battery terminals 21,22 make electrical contact with respective members 3, 4 to thereby provide electrical power to the device. The position of battery 20 is guided by guide tracks 8,9 which also provides an interlock with respective channels in battery 20 to ensure correct polarity during insertion.

Battery 20 will then abut battery 13 and by continuing the movement in direction of arrow A battery 20 will push battery 13 in the same direction. This will cause engaging slot 24 to move away from engaging pin 12 and therefore latch 10 may be released without affecting movement of batteries 13,20 in the direction of arrow A.

In accordance with the present invention electrical contact is maintained during removal of battery 13 by the concurrent sliding engagement of terminals 18,19,21,22 along respective members 3,4 so that electrical power can be continuously supplied to the device. The continuous movement of battery 20 in direction A will cause the ejection of battery 13 from assembly 1 after which battery 13 can be either recharged or discarded. When slot 25 is in alignment with engaging pin 12 battery 20 will be secured in assembly 1 due to the biasing of latch 10. Battery 20 can then advantageously continue to supply electrical power to the device until a further replacement battery is required at which time a replacement procedure similar to above can be repeated.

Figure 3:
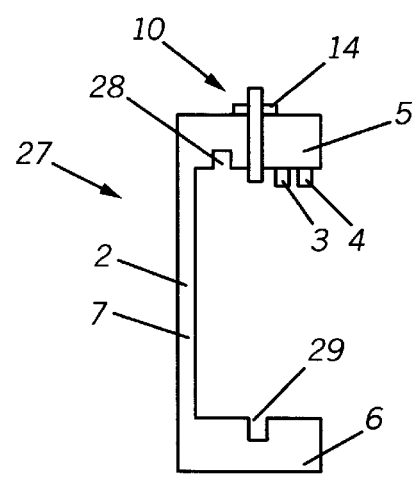
FIG. 3 is a side view illustrating a second embodiment of a battery terminal coupling assembly in accordance with the invention.

Referring to FIG. 3 a second embodiment of a battery coupling assembly 27 is illustrated. Assembly 27 is almost identical to assembly 1 the differences being that guide tracks 8,9 are replaced with slots 28,29 and elongate members 3,4 are mounted on member 5 so that they are spaced parallel and adjacent to each other. Assembly 27 may be used in a similar manner to that as described in the embodiment of FIGS. 1 and 2 and has the advantage of providing for the continuous supplying of electricity to the device during the removal and replacement of batteries without the need for switched capacitors.

To reiterate, it is an aim of this invention to overcome or alleviate at least one of the problems associated with continuously providing power to a battery powered portable device during battery replacement.

According to one aspect of the invention there is provided a battery coupling assembly for a portable device, the assembly comprising:

a housing with associated battery terminal engagement means for electrically engaging terminals of a supplying battery to thereby provide electrical power to said device, wherein the assembly provides for said terminal engagement means to continuously electrically engage terminals of a replacement battery during removal and replacement of said supplying battery.

Suitably, said battery terminal engagement means may allow concurrent sliding engagement of the terminals of said replacement battery and said supplying battery. Preferably, said assembly may further include releasable securing means for securement thereto of said supply battery. The releasable securing means may be an engagement means for complimentary engaging said supply battery. Preferably, said securing means may be a latch. Suitably, said latch may be biased to provide said securement. Preferably, said assembly may include at least one guide track. Suitably, said guide track may be a protrusion in said housing.

In an alternative form said guide track may be a slot in said housing. Preferably, there may be an interlocking means for ensuring correct engagement of said replacement battery. The terminal engagement means may comprise two spaced electrically conductive elongate members. Preferably, said elongate members may have opposing battery terminal contacting surfaces. Alternatively, said elongate members may be spaced parallel adjacent each other.

Although the invention has been described with reference to preferred embodiments it is to be understood that the invention is not restricted to any one of the embodiments described herein.

What is claimed is:

1. A battery coupling assembly for a portable device, the assembly comprising:
   a housing with associated battery terminal engagement means for electrically engaging terminals of a supplying battery to thereby provide electrical power to said device, wherein the assembly provides for said terminal engagement means in the form of permanently parallel tracks to continuously electrically engage terminals of a replacement battery during removal and replacement of said supplying battery and wherein the replacement battery displaces the supplying battery during removal and replacement.

2. A battery coupling assembly as claimed in claim 1, wherein said battery terminal engagement means allows concurrent sliding engagement of the terminals of said replacement battery and said supplying battery.

3. A battery coupling assembly as claimed in claim 1, wherein the assembly further includes a releasable securing means for securement thereto of said supplying battery.

4. A battery coupling assembly as claimed in claim 2, wherein the assembly further includes a releasable securing means for securement thereto of said supplying battery.

5. A battery coupling assembly as claimed in claim 4, wherein said releasable securing means is an engagement means for complimentary engaging said supply battery.

6. A battery coupling assembly as claimed in claim 5, wherein said securing means is a latch.

7. A battery coupling assembly as claimed in claim 6, wherein said latch is biased to provide said securement.

8. A battery coupling assembly as claimed in claim 2, said assembly further including at least one guide track for complementarily engaging a portion of both said replacement battery and said supply battery during the removal thereof.

9. A battery coupling assembly as claimed in claim 7, said assembly further including at least one guide track.

10. A battery coupling assembly as claimed in claim 9, wherein there is an interlocking means for ensuring correct engagement of said replacement battery.

* * * * *